United States Patent
Peters

(10) Patent No.: US 6,393,420 B1
(45) Date of Patent: May 21, 2002

(54) SECURING WEB SERVER SOURCE DOCUMENTS AND EXECUTABLES

(75) Inventor: Mark E. Peters, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/325,288

(22) Filed: Jun. 3, 1999

(51) Int. Cl.$^7$ .............................................. G06F 17/30
(52) U.S. Cl. ......................................... 707/9; 707/102
(58) Field of Search ..................................... 707/9, 102

(56) References Cited

U.S. PATENT DOCUMENTS

| | | | |
|---|---|---|---|
| 5,765,152 A | * 6/1998 | Erickson | 707/9 |
| 6,081,893 A | * 6/2000 | Grawrock et al. | 713/183 |
| 6,085,321 A | * 7/2000 | Gibbs et al. | 713/170 |
| 6,085,322 A | * 7/2000 | Rommey et al. | 713/176 |
| 6,094,731 A | * 7/2000 | Waldin et al. | 714/38 |
| 6,141,752 A | * 10/2000 | Dancs et al. | 713/172 |
| 6,158,007 A | * 12/2000 | Moreh et al. | 713/201 |
| 6,170,744 B1 | * 1/2001 | Lee et al. | 235/380 |
| 6,189,097 B1 | * 2/2001 | Tycksen, Jr. et al. | 713/156 |
| 6,226,743 B1 | * 5/2001 | Naor et al. | 713/177 |

OTHER PUBLICATIONS

Gupta et al., Identity Authentication Based on Keystroke Latencies, Feb. 1990, Communications of ACM, vol. 33, pp.168–176.*

Stiller man et al., Intrusion Detection for Distributed Applications, Jul. 1999, Communications of the ACM, vol. 42, No. 7, pp. 62–69.*

* cited by examiner

*Primary Examiner*—Frantz Coby
(74) *Attorney, Agent, or Firm*—Gregory M. Doudnikoff; Marcia L. Doubet

(57) ABSTRACT

A method, system, and computer readable code for validating that a document or executable to be served from a server is the same original document or executable placed on the server by the legitimate author or owner. Digital signatures are stored with each file available for serving from, or executing from, a server. When a file is requested by a user, the contents of the requested file are validated (i.e. authenticated) using this digital signature. If the validation does not succeed, the file is not served to the user—instead, the user is told that the requested file was not found. A number of optimizations are defined, including caching validated files and/or caching computed digests.

31 Claims, 7 Drawing Sheets

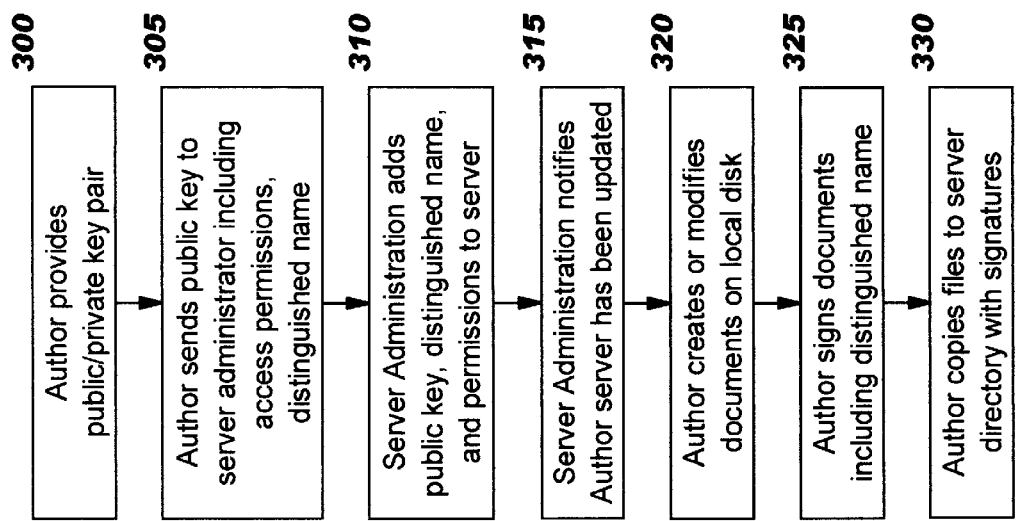

SECURING WEB SERVER SOURCE DOCUMENTS AND EXECUTABLES

BACKGROUND OF THE INVENTION

1. Field of the Invention

The present invention relates to a computer system, and deals more particularly with a method, system, and computer readable code for validating that a document or executable to be served from a server is the same original document or executable placed on the server by the legitimate author or owner.

2. Description of the Related Art

Use of the Internet and World Wide Web has skyrocketed in recent years. The Internet is a vast collection of computing resources, interconnected as a network, from sites around the world. It is used every day by millions of people. The World Wide Web (referred to herein as the "Web") is that portion of the Internet which uses the HyperText Transfer Protocol ("HTTP") a protocol for exchanging messages. (Alternatively, the "HTTPS" protocol can be used, where this protocol is a security-enhanced version of HTTP.)

A user of the Internet typically accesses and uses the Internet by establishing a network connection through the services of an Internet Service Provider (ISP). An ISP provides computer users the ability to dial a telephone number using their computer modem (or other connection facility, such as satellite transmission), thereby establishing a connection to a remote computer owned or managed by the ISP. This remote computer then makes services available to the user's computer. Typical services include: providing a search facility to search throughout the interconnected computers of the Internet for items of interest to the user; a browse capability, for selecting Web pages from a server location which are then served or delivered to the user and displayed on the local computer; download facilities, for requesting and receiving information from the Internet including (but not limited to) documents, Web pages, and executable programs; and an electronic mail facility, with which the user can send and receive mail messages from other computer users.

The user working in the Internet environment will have software running on his computer to allow him to create and send requests for information, and to see the results. These functions are typically combined in what is referred to as a "Web browser", or "browser". After the user has created his request using the browser, the request message is sent out into the Internet for processing. The target of the request message is one of the interconnected computers in the Internet network, commonly referred to as a "server". That server computer will receive the message, attempt to find the data satisfying the user's request, and return the located information to the browser software running on the user's computer. This server process is referred to herein as "serving" or "publishing" the information.

The information that is available on the Internet is placed there by the owner(s) of the information for the purpose of making it available to users for downloading, reading (i.e. browsing), executing (i.e. executables), etc. (The "owner" in this case is the author of the materials or someone who has been delegated to manage the materials on behalf of the author.) Typically, users of the information are only given "read access", and are not allowed to alter the owner's original information that is stored on the server. If the material is sensitive in nature and is intended for access by a limited set of users such as a specific company, work group or organization, then typically some form of user authorization process is employed to limit read access to the information only to specific users. This normally involves a security system that Add will ask the user for a predefined password in an attempt to verify the identity of the requesting user. Once the user proves to be authorized to access the material, they are allowed to browse the information, download it, etc. If, on the other hand, the information is intended for public access, then a user authorization process is not used and anyone with access to the Internet has free read access to the information.

The legitimate owners of the information placed on the Internet, as well as the ISPs, must also protect Internet resources such as the Internet servers where owners' information is stored and accessed by users. The ability to write to these servers, or "write access", is normally controlled by some form of security system that verifies the user has legitimate access to the information (typically the owner or author). Controlling write access to the servers is critical since it is the facility used by legitimate authors or owners to store, update or otherwise maintain the material available to the Internet users. Normally, write access to Internet servers is not granted to typical Internet users—with the possible exception of personal Web pages that may be offered to Internet users by their ISP. Even then, the ISP protects the Internet servers by typically requiring the user to verify who they are through a security system, and limits the user's write access on the Internet server to only the data the Internet user owns.

Hackers have been able to bypass the various security systems in the past and, despite continuing efforts to improve security systems, it can be assumed that hackers will continue to penetrate security systems and gain unauthorized access to resources such as the Internet servers. Hackers may access Internet servers for a variety of reasons, and may perform many different kinds of acts once they gain access to a server. They may obtain read access to documents for which they are not authorized. Or, they may alter or remove files or executables that are available to be served to users requesting the information. More malicious acts of hackers include planting viruses, removing files, replacing files with corrupted material, or other acts damaging the server content, or even causing the server to fail completely. The more severe forms of tampering, such as disabling a server site on the Internet, are normally detected quickly since anyone trying to access the server will receive some form of indication of the failure. Other forms of tampering, such as replacing legitimate material with malicious materials or planting a virus, may go undetected for a long period of time. During the time period from the alteration to its detection, the material may have been served to thousands of unsuspecting users. Because of the communication paradigm used for Internet computing, it is typically impossible to notify all the users who have received corrupted information after the fact. Instead, the material will continue to be served until the alteration is detected and appropriate measures are taken (such as removing the material or even disabling the site). There is currently no systematic way to detect altered content in this environment. The owner of material that has been corrupted may be notified by a user who has received the corrupted material. Or, the owner may notice the tampering during a review of the server content. It is, however, unlikely that an owner will perform such a review on a timely basis. It is even more unlikely that a user of the information will be able to detect subtle alterations to the served material.

Even when password protection is in place for read and write access to the information on a server, it is still possible for malicious alteration to occur. There are many well known sniffer attacks where FTP (file transfer protocol) and telnet passwords are intercepted during legitimate transmission and then used by hackers to modify a site. For example, several U.S. government judicial and law enforcement sites have been hacked such that the text and images available from the site were altered. One solution is to use secure shell or secure file transfer to hide the password, but strong encryption is generally required to provide adequate protection. A disadvantage of this solution is that strong encryption is subject to government regulation and, in cases where content does not need to be kept private, the encryption is computational overhead that is generally not necessary.

Accordingly, a need exists for a technique to ensure that a document or executable that is served to a requesting user is unchanged from the version placed there by the legitimate author or owner.

SUMMARY OF THE INVENTION

An object of the present invention is to provide a technique whereby the content of material available through the Internet is verified prior to being delivered or served to the requestor.

A further object of the present invention is to provide this technique by authenticating that the author of the material was the legitimate author.

Another object of the present invention is to provide a technique whereby a document or executable deemed to be corrupted is not delivered to the requestor.

Yet another object of the present invention is to provide a technique whereby the author or owner of the materials is notified that the material has been corrupted.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a system, method, and computer-readable code for use in a computing environment having a connection to a network. In a first aspect, the present invention comprises a technique for preventing information from being published over a network in a computing environment after an unauthorized alteration of the information. This technique further comprises: storing one or more files on a storage medium accessible to a first computer in the computing environment; storing a digital signature for each of the files, each of the digital signatures being stored in a location accessible to the first computer; receiving a request for a selected one of the files from a user of a second computer in the computing environment; authenticating, responsive to the receiving, that the requested file was created by an authorized author; and publishing the requested file to the user only when the authenticating has a successful result. This may further comprise notifying the user that the requested file was not found when the authenticating has an unsuccessful result. In addition, an additional notification may be generated when the authenticating has an unsuccessful result, where the notification comprises one or more of an alert and a log record. The authentication may further comprise: retrieving the requested file from the storage medium; computing a cryptographic digest of the retrieved file; decrypting the stored digital signature for the retrieved file; and comparing the computed digest to the decrypted signature, wherein the successful result occurs when the comparison detects that the computed digest and the decrypted signature are identical. Or, the authentication may further comprise: retrieving the requested file from the storage medium; computing a cryptographic digest of the retrieved file; determining whether an entry exists in a validation cache for the requested file, where this entry comprises a previously validated digest for the requested file; comparing the computed digest to the previously-validated digest, wherein the successful result occurs when the comparison detects that the computed digest and the previously-validated digest are identical; validating the retrieved file when the entry does not exist or the comparison detects that the computed digest and the previously-validated digest are not identical; and storing the computed digest in the validation cache for a future invocation of the authentication when the authentication has a successful result. The validation preferably further comprises: decrypting the stored digital signature for the retrieved file; and comparing the computed digest to the decrypted signature, wherein the successful result occurs when this comparison detects that the computed digest and the decrypted signature are identical. The authentication may further comprise: determining whether a certificate of the author is valid, and wherein the successful result occurs only if the certificate is valid, this determination indicating that the certificate is valid if the certificate has either of: a locally-stored trusted status or a trusted status derived from a higher-level trusted certificate authority. In addition, this may further comprise verifying one or more permissions of the author, and these permissions may comprise one or more of: a first permission to create files in a particular directory where the requested file is stored on the storage medium; and a second permission to create files for a particular action type associated with the requested file.

This technique may further comprise initializing the validation cache, wherein the initialization further comprises: retrieving selected ones of the stored files; computing the cryptographic digest for each of the selected files; and storing each of the computed digests in the validation cache.

The decrypting may use a public key of the authorized author. Optionally, a system cache may be used to optimize performance of the system. This further comprises: checking the system cache for the requested file prior to operation of the authentication; bypassing operation of the authentication if the checking locates the requested file in the system cache; and wherein the publishing publishes the located file following operation of the bypassing operation; and storing the retrieved file in the system cache for the future invocation when the authentication has a successful result. Optionally, this bypassing may further require that a cache timestamp of the located file and a timestamp of the requested file on the storage medium are identical.

In this technique, the authorized author may be an automated file generation process. The stored digital signature may be stored externally from the retrieved file. Or, the stored digital signature may be embedded within the retrieved file.

In another aspect, the present Invention comprises a technique for securing Web server content in a computing environment connected to a network. This technique comprises: storing one or more files on a storage medium accessible to a Web server in the computing environment; storing a digital signature for each of the files, each of the digital signatures being stored in a accessible to the Web server; authenticating that selected ones of the stored files were created by an authorized author; and for any of the selected files for which the authentication has an unsuccessful result, making these files unavailable for publishing over the network. Making the files unavailable may further comprise deleting the files from the storage medium. The authentication may further comprise: retrieving each of the selected ones from the storage medium; and validating each of the retrieved ones. The validation may further comprise: computing a cryptographic digest of the retrieved file; decrypting the stored digital signature for the retrieved file; and comparing the computed digest to the decrypted signature, wherein the unsuccessful result occurs when the comparing step detects that the computed digest and the decrypted signature are not identical.

In yet another aspect, the present invention comprises a technique for securely serving an aggregated document from a first server connected to a computer network to a user connected to the network, wherein the aggregated document is comprised of one or more other documents obtained by the first server from one or more other servers in addition to zero or more documents locally accessible to the first server. This technique comprises: requesting the other documents from selected ones of the other servers; receiving the requested documents; validating that each of the received documents was created by an authorized author; and serving the aggregated document to the user only if each of the received files has a successful outcome in a comparison process. The validation may further comprise: computing a cryptographic digest of the received document; retrieving a digital signature for the received document, wherein the digital signature was previously created by an author of the received document; decrypting the retrieved digital signature using a public key of the author; and comparing the decrypted signature to the computed digest, wherein the comparison has a successful outcome only if the decrypted signature and the computed digest are identical.

The present invention will now be described with reference to the following drawings, in which like reference numbers denote the same element throughout.

BRIEF DESCRIPTION OF THE DRAWINGS

FIG. 3 illustrates the processes that may be involved in creating or updating a file by the author or owner of the file;

DESCRIPTION OF THE PREFERRED EMBODIMENT

Figure 1:
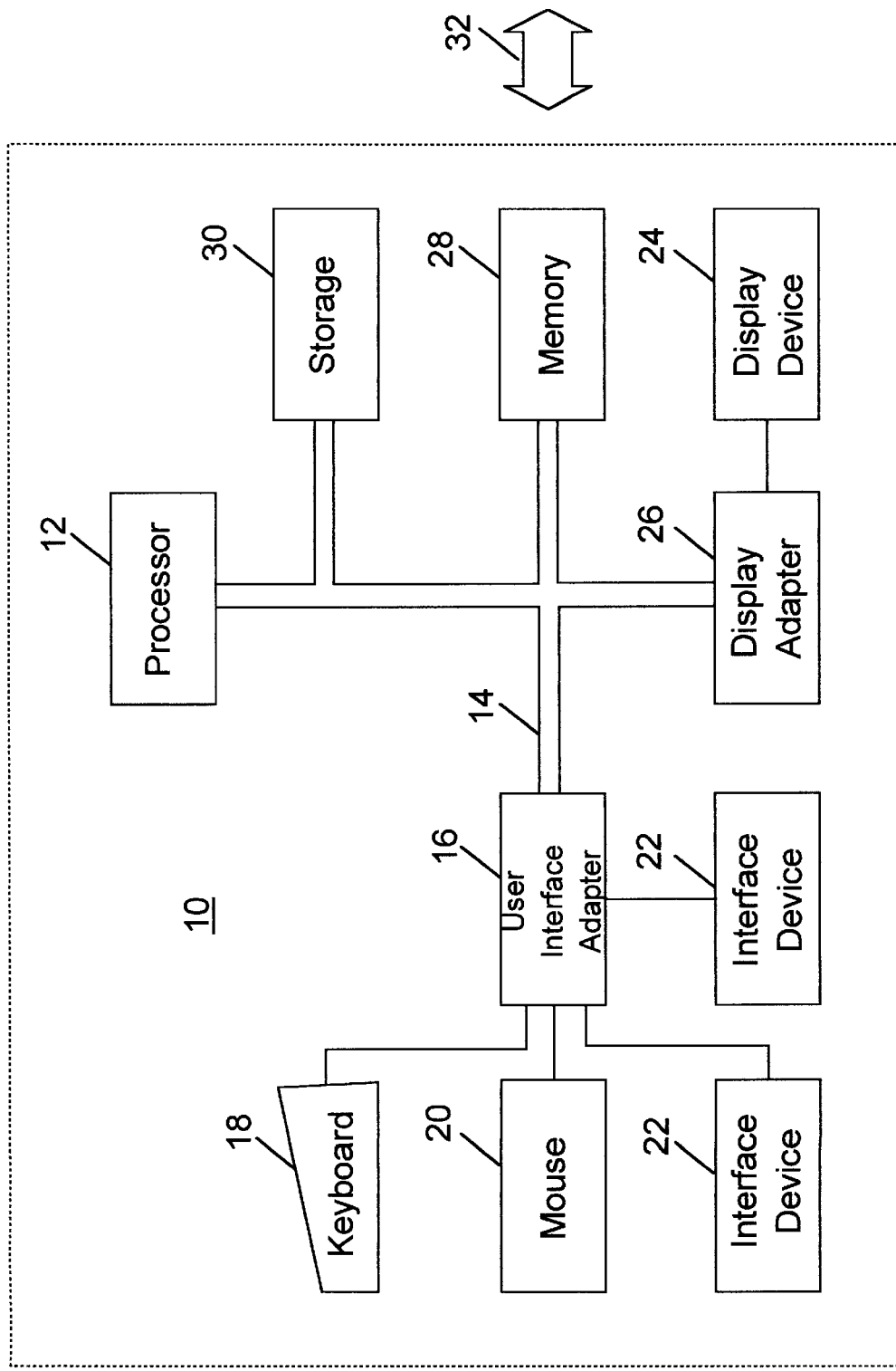
FIG. 1 is a block diagram of a computer workstation environment in which the present invention may be practiced.

FIG. 1 illustrates a representative workstation hardware environment in which the present invention may be practiced. The environment of FIG. 1 comprises a representative computer or intelligent workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive diskette drive, tape drive, etc.

The workstation 10 communicates via a communications channel 32 with other computers or networks of computers. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
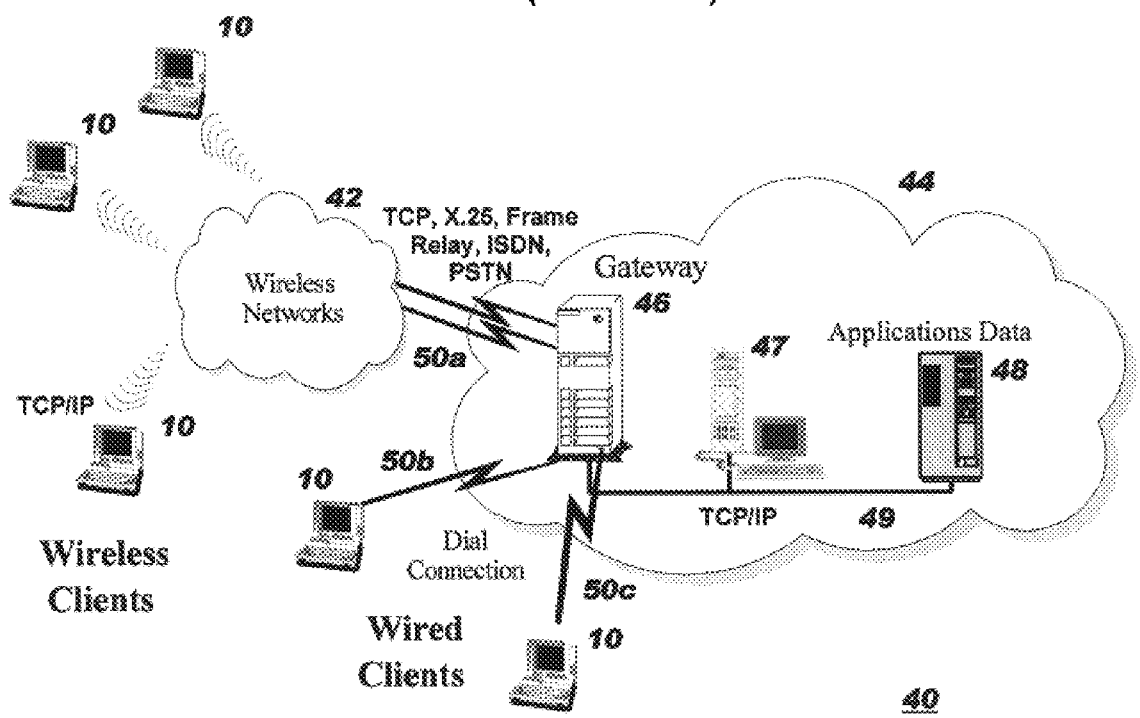
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM, "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network. 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50*b* or 50*c*. Further, the wireless network 42 and network 44 may connect to one or more other networks (not shown), in an analogous manner to that depicted in FIG. 2.

Software programming code which embodies the present invention is typically accessed by the microprocessor 12 of the server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor, 12 using the bus 14. The techniques and methods for embodying software programming code in memory, on physical media, and/or distributing software code via networks are well known and will not be further discussed herein.

A user's computer from which a file request is generated, invoking the present invention, may be connected to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The computer may be any type of computer processor, including laptop, handheld or mobile computers; vehicle-mounted devices; desktop computers; mainframe computers; etc., having processing (and optionally communication) capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation", "machine", "device", or "computer", and use of any of these terms or the term "server" refers to any of the types of computing devices described above.

The preferred embodiment of the present invention will now be discussed with reference to FIGS. 3 through 5.

In the preferred embodiment, the present invention is implemented as one or more modules of a computer software program. (Alternatively, portions of the present invention may be implemented in hardware to increase performance or security, including use of cryptographic hardware.) This program will be used where a client has sent a request for data to a server, and comprises part of the processing done on the server side of the network. Typically, the program will be used in an Internet environment, where the server is a Web server and the request is formatted using HTTP (or HTTPS). Alternatively, the server may be in a corporate intranet, and extranet, or any other type of network. Use of the term "Internet" herein, when discussing processing associated with the user's request, includes these other network environments, unless otherwise stated.

FIG. 3 illustrates the preferred embodiment of the process the author or owner of a file will follow to create or modify a file. The author acquires a key pair 300 consisting of a public private key. This key pair may be newly created by the author or it may be an existing key pair (in order to minimize the number of key pairs owned and maintained). (Key pairs, and techniques for obtaining and using them are well known in the art and will not be discussed in detail herein.) The author maintains the private key locally in some protected fashion (a password protected file or smart card, for example) that prevents anyone else from acquiring the private key. The public key is then sent 305 to a server administrator who is responsible for the server where the author is placing the file(s). Along with the public key, the author also sends a list of permissions that he wishes to have on this server, and a distinguished name. The permissions preferably include action types and location information. For example, the author may be granted the ability to publish static HTML (HyperText Markup Language) files and images, but not create executables or shell scripts. The distinguished name is a unique name that identifies this particular user. (Distinguished names are well known in the art and will not be discussed in detail herein.) The server administrator then adds 310 the author's public key, distinguished name, and permissions that have been granted, to the local server configuration. The server administrator then notifies 315 the author that the server has been updated. The author may then create or update file(s) for this server. Preferably, a staging area on a local disk will be used 320 instead of creating/updating the files directly on the server. When the creation or updating of a file is complete, the author then digitally signs 325 the file. Either an embedded signature or a detached file signature may be created, depending on what the server supports and is configured to accept. The distinguished name is associated with the digital signature of the file for use during the validation process described below with reference to FIGS. 4 and 5. The author then copies the file(s) 330 to the appropriate location on the server (along with the signature files, if the signature is separate). The author and server administrator have now completed all tasks needed to prepare for operation of the present invention.

Figure 4A:
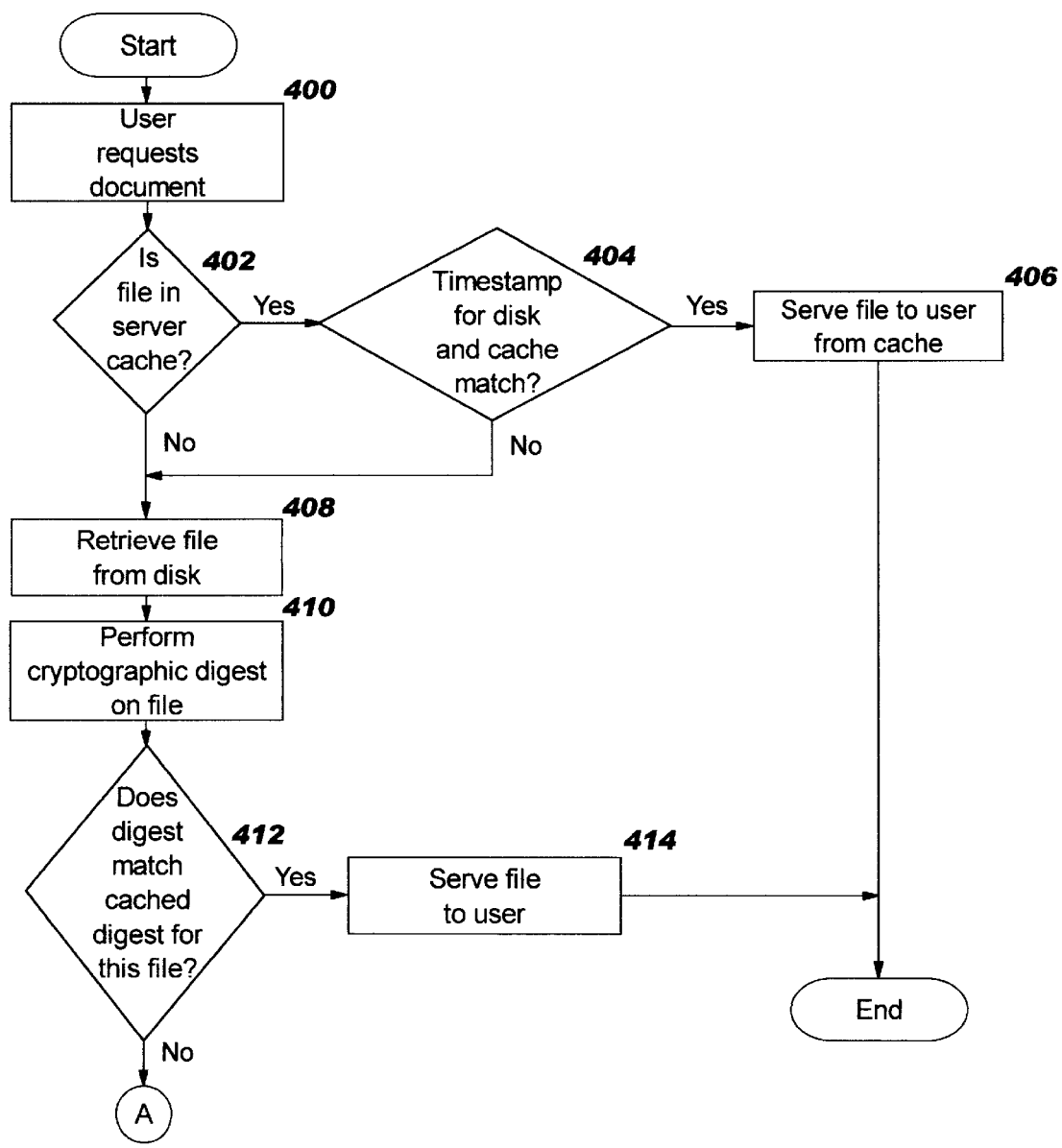
FIGS. 4A–4C illustrate the logic used to implement the author authentication process of the preferred embodiment of the present invention.
Figure 4B:
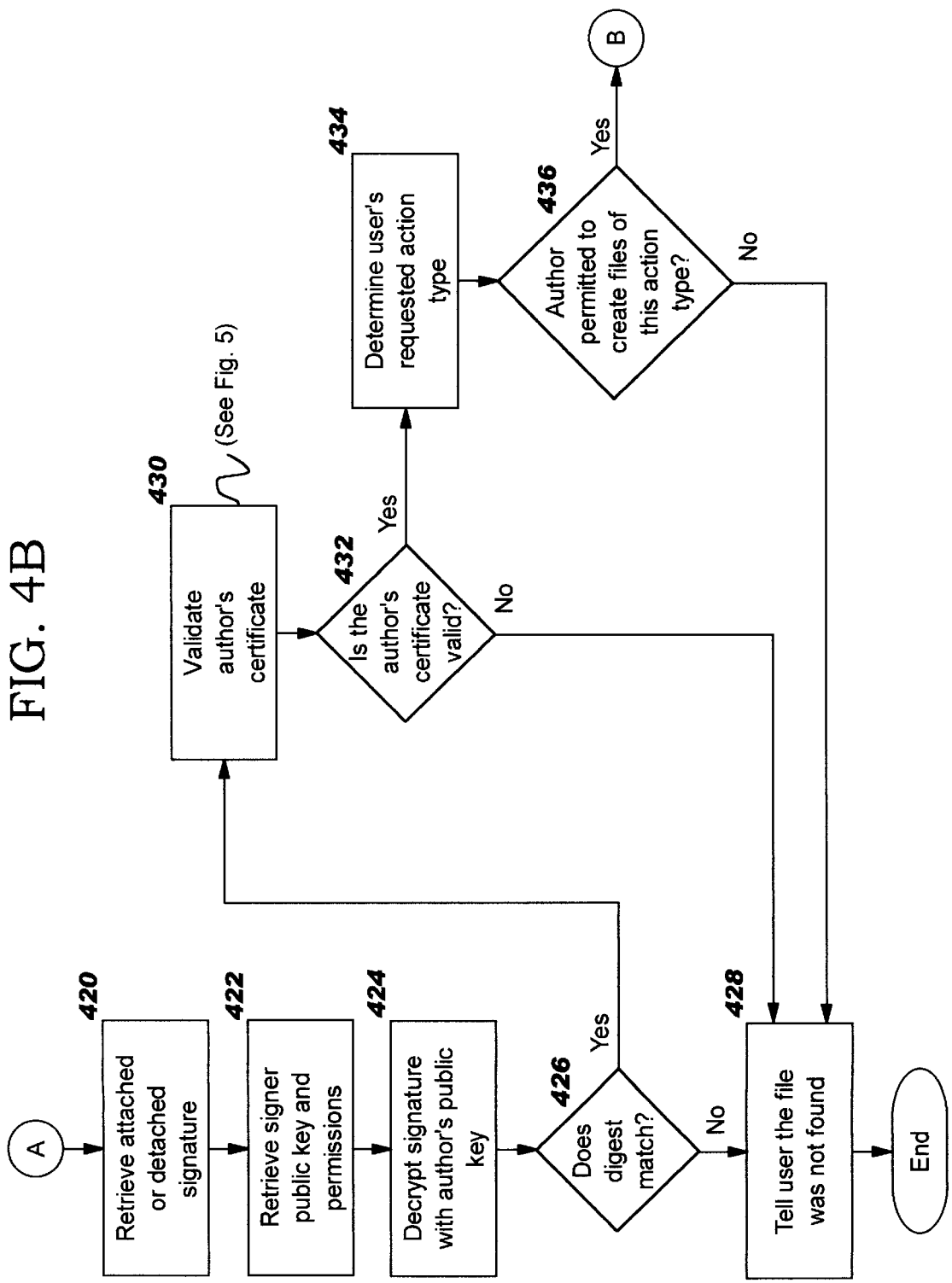
Figure 4C:
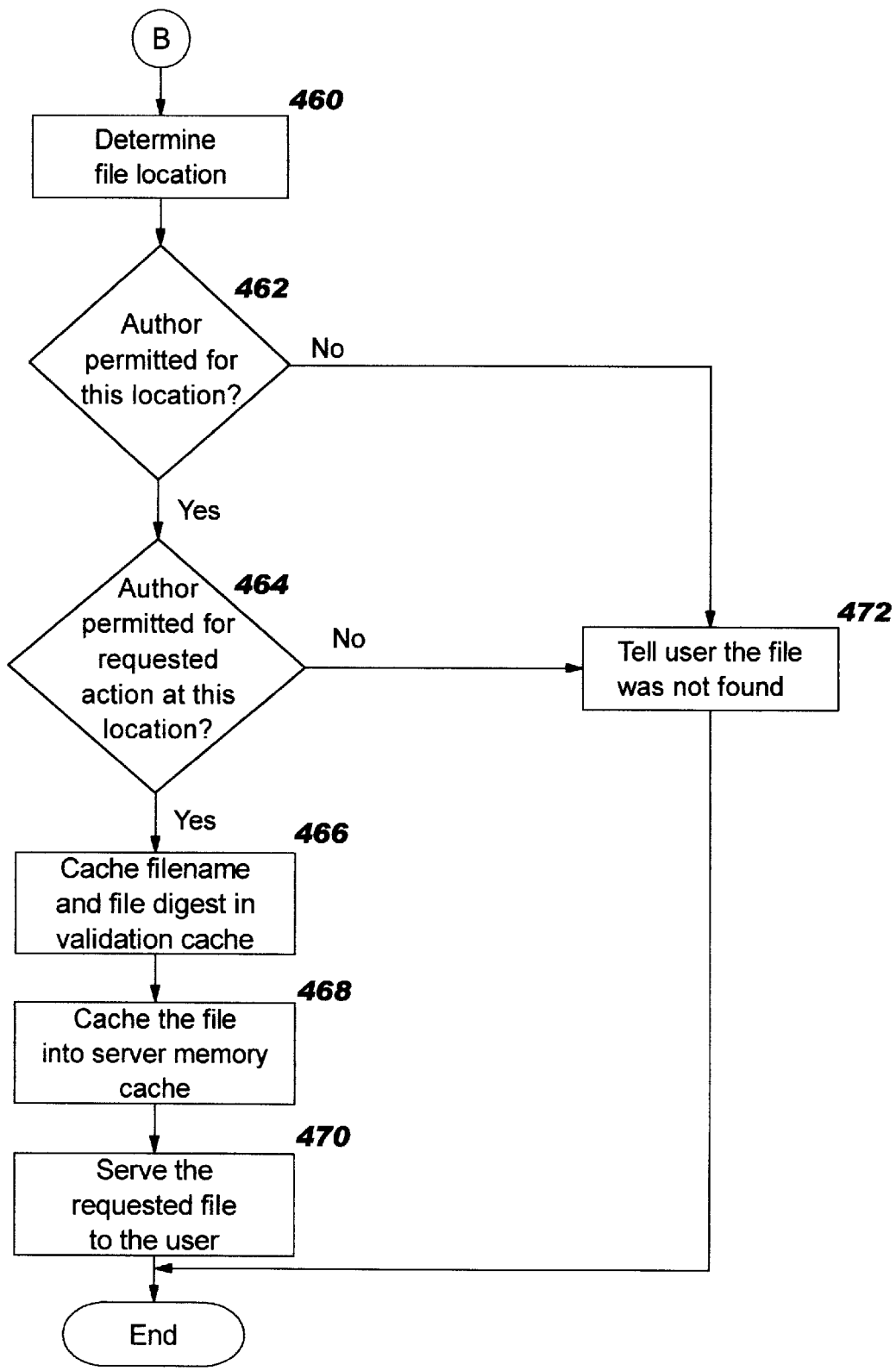
Figure 5:
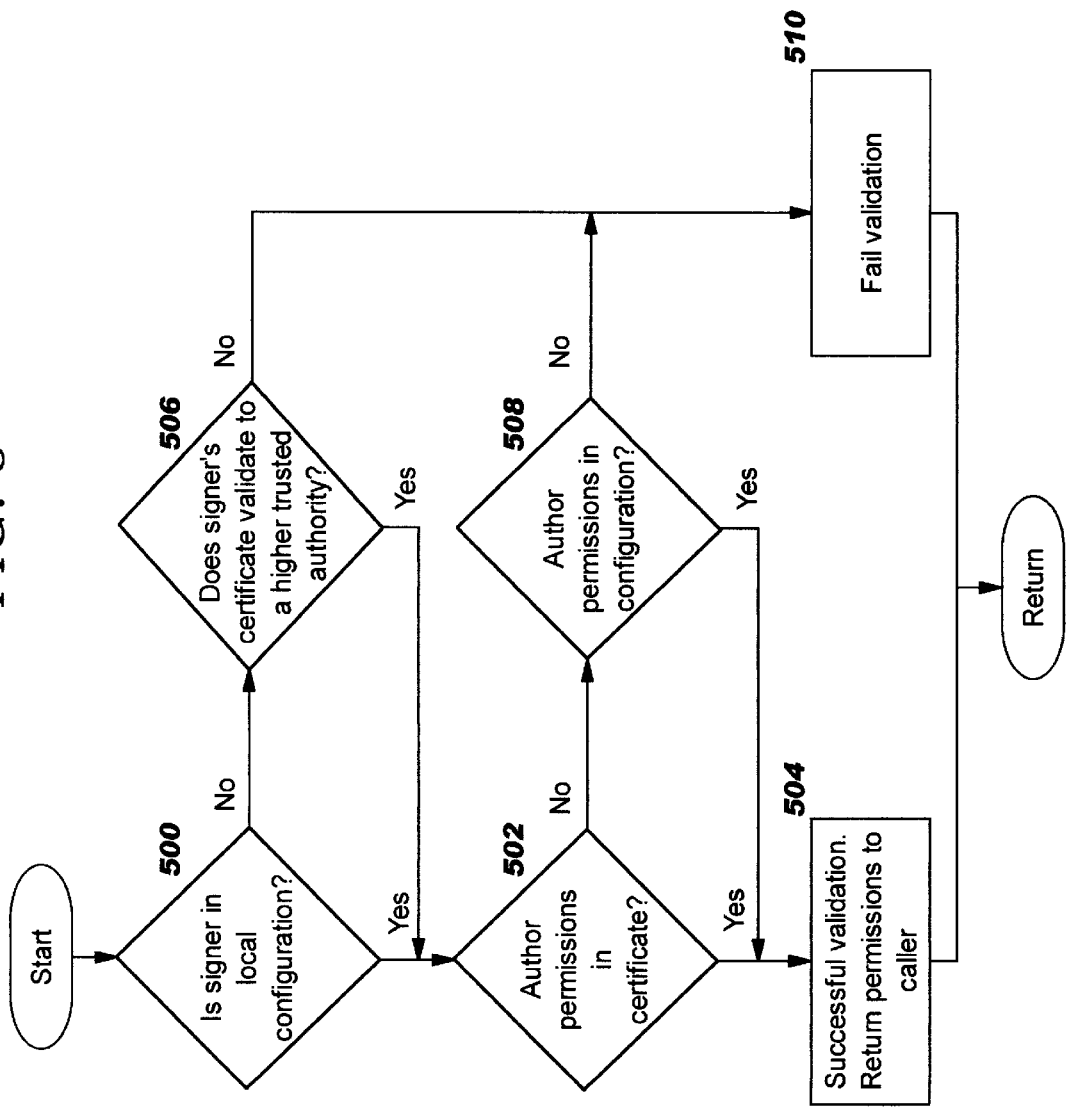
FIG. 5 illustrates an optional enhancement of the preferred embodiment whereby an author's stored permissions may be used to further validate the authenticity of a stored file.

FIG. 4 and 5 illustrate the preferred embodiment of the process with which the present invention validates a file before serving it to a requesting user, to ensure that no unauthorized alterations of the file content have been made. As shown in FIG. 4A, the process begins when a server receives a request 400 for a document from a user. The server then performs a check of the memory cache 402 to see if the requested file is currently stored in the cache. Memory cache (referred to equivalently herein as "system cache") is frequently used to improve the response time of a server, and involves storing a copy of frequently requested files in memory or other high-speed storage. When a file is stored in memory cache, the server typically does not have to retrieve the file from disk before serving the file to the requesting user (unless the caching mechanism removes the file from the cache, or otherwise determines that the cached copy is no longer usable). In the preferred embodiment of the present invention, if the requested file is cached in the memory cache, this indicates that the file has already been validated (as will be described in more detail below with reference to Block 468 of FIG. 4C). An optional aspect of the present invention provides for a timestamp to be included with the file as it is placed in the server memory cache. This timestamp is the timestamp from the file on disk that is created (or updated) when the file is created or modified. (Hereinafter, the term "created" will be used to refer to changes that either create a new file or modify an existing file.) If the file is in the server memory cache 402, then the associated timestamp is compared 404 to the timestamp associated with the current file on disk. If the timestamps match, this indicates that the file is considered validated and that it is the same file created by the legitimate author. The file is then served 406 to the requester from the server memory cache and processing of this file request ends. When this optional aspect is not implemented, the comparison 404 is omitted (as will be obvious to one of ordinary skill in the art).

These initial steps (400, 402, optionally 404, and 406) indicate the minimal impact the present invention has on server processing after the initial request and validation for a given file has occurred, and the validated file has been placed in the server memory cache (along with the optional timestamp).

If the requested file is not in the server memory cache 402 or, if present but the optional comparison of the timestamp 404 between the cached file and the disk file does not match, then the requested file is retrieved from disk 408. This retrieved file is then cryptographically digested 410. (Cryptographic digests and the techniques for performing them, are well known in the art. As will be obvious, this digest must use the same algorithm used by the author when he created the digital signature for this requested file.) The digest is then compared 412 to a previous digest of the same file that may have been stored locally on the server in a "validation cache". As used herein, the term "validation cache" refers to a cache that is protected from unauthorized access (such that the contents are considered "trusted"). According to the preferred embodiment of the present invention, after a file has been successfully validated, the name of the file along with its digest are stored in the validation cache (as will be discussed below with reference to Block 466 of FIG. 4C). If the digests match, the file is served 414 (i.e. delivered) to the user. If the digests do not match including the case where no entry for the requested file was found in the validation cache, processing continues to FIG. 4B.

Control reaches 420 of FIG. 4B when, as previously described, the requested file was not found in the server memory cache 402 (or it was found but the optional timestamp comparison 404 did not match), and the file digest was either not found in the trusted cache or did not match 412. At Block 420 of FIG. 4B, the signature for the requested file is retrieved. This signature may be either in a separate signature file or attached to the actual file (as previously described above for FIG. 3, Block 325). The author's public key and permissions are then retrieved 422 from the local server using the distinguished name previously associated with the file signature. (The author's public key, distinguished name, and permission information were stored by the system administrator as indicated in FIG. 3, Block 310.) The requested file's signature is then decrypted 424 using the author's public key. The digest computed at Block 410 of FIG. 4A is then compared 426 to the digest resulting from the decryption of the signature 424. If the digests do not match, the file is considered invalid. In the preferred embodiment, the invalid file is not served to the requestor. Instead, the user is notified 428 that the requested file was not found. In another aspect of the present invention, additional notifications mechanisms may optionally be implemented, such as generating an alert to a system administrator, logging information in a file, etc. If the comparison of the digests 426 indicates that they match (i.e. they are identical), further validation of the author may be performed.

First, the author's certificate is validated 430. The steps for validating the author's certificate will be discussed more in detail below with reference to FIG. 5. If the author's certificate is deemed invalid 432, the user is notified that the requested file was not found 428. This notification, as discussed earlier, can optionally include alerts to the author and/or server administrator, generation of log records. etc. If the author's certificate is deemed valid 432, then the type of action requested by the user is determined 434. These action types include serving a file, executing a file, etc. The previously-defined author permissions (see Block 310 of FIG. 3) are retrieved. If the author is not permitted to create files of this action type 436, the user is notified that the requested file is not found 428. If the author is permitted to create files of that action type 436, then, continuing to the processing in FIG. 4C, the location of the requested file is determined 460. This location would typically be defined as a location within a file system or directory structure of a server machine. The author's permissions are checked to ensure the author has permission for this location 462. If the author does not have permission for this location, the "file not found" response is returned to the user 472. If the author does have permission for this location, then the requested action (as described above for Block 436 of FIG. 4B) is checked to verify that the author is permitted for this action type at this location 464. If not, the "file not found" response is returned to the user 472. If the author is permitted for the requested action type at the requested location 464, then the file is served to the requesting user 470.

In the preferred embodiment of the present invention, now that the file content has been validated, a copy of the file is placed in the server memory cache 468. This enables subsequent requests for the file to bypass repetitive validations of the already validated content. In addition to placing the file in the server memory cache, a timestamp associated with the disk file may optionally be included, as discussed above with reference to Block 404 of FIG. 4A. The file digest computed at Block 410 of FIG. 4A, which has been validated by comparing it with the author's digest (see FIG. 4B, Block 426) is also stored in the validation cache, along with the file name (Block 466). Storing the file digest in the validation cache allows bypassing the validation procedure on subsequent requests for the file.

FIG. 5 illustrates the steps used to validate the author's certificate. Preferably, an X.509 certificate is used. (X.509 certificates are well known in the art, and will not be discussed in detail herein.) Referring to FIG. 5, at Block 500 a check is made to see if the author is defined in the local server configuration files. This would typically be a secure administrator's file on the local system. If the author is not defined in the local configuration, then the author's certificate is used to determine if it validates to a higher-level trusted authority 506. This higher authority may, for example, include a higher locally known and trusted authority on the server (such as "root"). If the author's certificate does not validate to a higher trusted authority, then the validation of the author's certificate fails 510. If the author's certificate does validate to a higher trusted authority, then a check is made to determine whether the author's permissions are in the certificate 502. If the authors permissions are not in the certificate, then a check is made to see if the author permissions are in the local configuration 508. If no author permissions are found, the validation of the certificate fails 510. If the author permissions are found in the certificate or in the local configuration, then the certificate validation passes and the permissions are returned to the caller 504.

A number of alternative approaches to the preferred embodiment will now be described. In one alternative aspect, the author validation process may be omitted. This aspect comprises omitting the processing of Blocks 430

(FIG. 4B) through 470 (FIG. 4C), and serving the file to the user following a successful result in Block 426 of FIG. 4B. Note that in this aspect, an author's certificate is not used. The public key retrieved in Block 422 of FIG. 4B must be stored in a local configuration file (as has been previously discussed above with reference to Block 500 of FIG. 5).

In yet another alternative aspect, a system cache is not used. This aspect comprises omitting the processing of Blocks 402 through 406 of FIG. 4A and Block 468 of FIG. 4C.

In a further alternative aspect, the validation cache is not used. This aspect comprises the omitting the processing of Blocks 412 and 414 of FIG. 4A and Block 466 of FIG. 4C.

In the preferred embodiment, the validation of the file and author is performed by an approach termed herein as "lazy evaluation". Lazy evaluation means the server does not proactively validate the contents of the files or the validity of the author until a file is requested by a user. In an optional enhancement of this approach, some number of the stored files may be pre-validated. validated. This pre-validation may be performed when an author updates or creates a file. This may be termed "seeding" or "initializing" the validation cache, and preferably comprises retrieving selected files, computing a cryptographic digest of the file contents for each file, and storing the digests in the validation cache using the techniques previously described. Alternatively, a Web "spider" approach may be used whereby selected directories may be programmatically traversed and the files stored in that directory are pre-validated. This pre-validation has the advantage of avoiding the validation process required when processing a user request for any pre-validated file. The technique used for this pre-validation is to retrieve a file, compute a cryptographic digest of the file contents, certify author and permissions, validate the signature, and making any files unavailable for serving which do not pass the validation successfully, using the techniques previously described. Another variation is a spider executed with the intent of finding files which do not validate so that a report can be sent to the site administrator.

In still another alternative aspect, the present invention may be used to validate aggregated documents. As used herein, the term "aggregated document" refers to a document comprised of multiple other documents, some of which are obtained from other servers. In the current art, an SSL (Secure Sockets Layer) session is established to each server from which a document will be requested. Establishment of an SSL session is a relatively expensive process, and only validates the server (and not the actual author or contents of a requested file). Using the techniques of the present invention, the requesting server may validate the signature of each file received from a remote location. This is done by computing the cryptographic digest for each file, retrieving a digital signature associated with each file, decrypting the digital signature using the file author's public key, and comparing the computed digest to the decrypted signature (using the techniques described above). An aggregated file is then served to the requesting user only if each component file is successfully validated in this manner.

Note that use of the present invention is not intended to prevent unauthorized deletion or change to stored files. However, the present invention will prevent corrupted files from being served to a requesting user, as has been demonstrated. Note further that the "author" of a file on which the present invention operates may be a human, or may alternatively be an automated file generation process (e.g. where an executing program generates an output file).

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed:

1. A system in a computing environment for preventing information from being published over a network in said computing environment after an unauthorized alteration of said information, comprising:

one or more files stored on a storage medium accessible to a first computer in said computing environment;

a digital signature for each of said one or more files, each of said digital signatures being stored in a location accessible to said first computer;

means for receiving a request for a selected one of said files from a user of a second computer in said computing environment;

means for authenticating, responsive to said means for receiving, that said requested file was created by an authorized author; and means for publishing said requested file to said user only when said means for authenticating has a successful result.

2. The system for preventing information from being published after an unauthorized alteration of said information according to claim 1, further comprising:

means for notifying said user that said requested file was not found when said means for authenticating has an unsuccessful result.

3. The system for preventing information from being published after an unauthorized alteration of said information according to claim 2, further comprising means for generating an additional notification when said means for authenticating has said unsuccessful result, said additional notification comprising one or more of: an alert and a log record.

4. The system for preventing information from being published after an unauthorized alteration of said information according to claim 1, wherein said means for authenticating further comprises:

means for retrieving said requested file from said storage medium;

means for computing a cryptographic digest of said retrieved file;

first means for determining whether an entry exists in a validation cache for said requested file, said entry comprising a previously-validated digest for said requested file;

first means for comparing said computed digest to said previously-validated digest, wherein said successful result occurs when said first means for comparing detects that said computed digest and said previously-validated digest are identical; and means for validating said retrieved file when said entry does not exist or said first means for comparing detects that said computed digest and said previously-validated digest are not identical, further comprising:

means for decrypting said stored digital signature for said retrieved file; and second means for comparing said computed digest to said decrypted signature, wherein said successful result occurs when said second means for comparing detects that said computed digest and said decrypted signature are identical; and further comprising:

means for storing said computed digest in said validation cache for a future invocation of said means for authenticating when said means for authenticating has said successful result.

5. The system for preventing information from being published after an unauthorized alteration of said information according to claim 4, wherein said means for authenticating further comprises second means for determining whether a certificate of said author is valid, and wherein said successful result occurs only if said certificate is valid, said second means for determining indicating that said certificate is valid if said certificate has either of: a locally-stored trusted status or a trusted status derived from a higher-level trusted certificate authority.

6. The system for preventing information from being published after an unauthorized alteration of said information according to claim 5, further comprising means for verifying one or more permissions of said author.

7. The system for preventing information from being published after an unauthorized alteration of said information according to claim 6, wherein said permissions comprise one or more of:

a first permission to create files in a particular directory where said requested file is stored on said storage medium; and a second permission to create files for a particular action type associated with said requested file.

8. The system for preventing information from being published after an unauthorized alteration of said information according to claim 4, further comprising means for initializing said validation cache, wherein said means for initializing further comprises:

means for retrieving selected ones of said stored tiles, means for computing said cryptographic digest for each of said selected files; and means for storing each of said computed digests in said validation cache.

9. The system for preventing information from being published after an unauthorized alteration of said information according to claim 4, further comprising:

means for using a system cache to optimize performance of said system, further comprising:

means for checking said system cache for said requested file prior to operation of said means for authenticating;

means for bypassing operation of said means for authenticating if said means for checking locates said requested file in said system cache; and wherein said means for publishing publishes said located file following operation of said means for bypassing; and means for storing said retrieved file in said system cache for said future invocation when said means for authenticating has said successful result.

10. The system for preventing information from being published after an unauthorized alteration of said information according to claim 9, wherein said means for bypassing further requires that a cache timestamp of said located file and a timestamp of said requested file on said storage medium are identical.

11. A method for preventing information from being published over a network in a computing environment after an unauthorized alteration of said information, comprising the steps of:

storing one or more files on a storage medium accessible to a first computer in said computing environment;

storing a digital signature for each of said one or more files, each of said digital signatures being stored in a location accessible to said first computer;

receiving a request for a selected one of said files from a user of a second computer in said computing environment;

authenticating responsive to said receiving step, that said requested file was created by an authorized author; and publishing said requested file to said user only when said authenticating step has a successful result.

12. The method for preventing information from being published after an unauthorized alteration of said information according to claim 11, further comprising the step of:

notifying said user that said requested file was not found when said authenticating step has an unsuccessful result.

13. The method for preventing information from being published after an unauthorized alteration of said information according to claim 12, further comprising the step of generating an additional notification when said authenticating step has said unsuccessful result, said additional notification comprising one or more of: an alert and a log record.

14. The method for preventing information from being published after an unauthorized alteration of said information according to claim 11, wherein said authenticating step further comprises the steps of:

retrieving said requested file from said storage medium;

computing a cryptographic digest of said retrieved file;

decrypting said stored digital signature for said retrieved file; and comparing said computed digest to said decrypted signature, wherein said successful result occurs when said comparing step detects that said computed digest and said decrypted signature are identical.

15. The method for preventing information from being published after an unauthorized alteration of said information according to claim 14, wherein said decrypting step uses a public key of said authorized author.

16. The method for preventing information from being published after an unauthorized alteration of said information according to claim 14, wherein said stored digital signature is stored externally from said retrieved file.

17. The method for preventing information from being published after an unauthorized alteration of said information according to claim 14, wherein said stored digital signature is embedded within said retrieved file.

18. The method for preventing information from being published after an unauthorized alteration of said information according to claim 11, wherein said authorized author may be an automated file generation process.

19. A method for securing Web server content in a computing environment connected to a network, comprising the steps of:

storing one or more files on a storage medium accessible to a Web server in said computing environment;

storing a digital signature for each of said one or more files, each of said digital signatures being stored in a location accessible to said Web server;

authenticating that selected ones of said stored files were created by an authorized author; and for any ones of said selected files for which said authenticating step has an unsuccessful result, making said ones unavailable for publishing over said network.

20. The method for securing Web server content according to claim 19, wherein said making said ones unavailable step comprises deleting said ones of said selected files from said storage medium.

21. The method for securing Web server content according to claim 19, wherein said authenticating step further comprises the steps of:
- retrieving each of said selected ones from said storage medium; and
- validating each of said retrieved ones, further comprising the steps of:
  - computing a cryptographic digest of said retrieved file;
  - decrypting said stored digital signature for said retrieved file; and
  - comparing said computed digest to said decrypted signature, wherein said unsuccessful result occurs when said comparing step detects that said computed digest and said decrypted signature are not identical.

22. A computer program product on a computer-readable medium in a computing environment for preventing information from being published over a network in said computing environment after an unauthorized alteration of said information, comprising:
- one or more files stored on a storage medium accessible to a first computer in said computing environment;
- a digital signature for each of said one or more files, each of said digital signatures being stored in a location accessible to said first computer;
- computer-readable program code means for receiving a request for a selected one of said files from a user of a second computer in said computing environment;
- computer-readable program code means for authenticating, responsive to said computer-readable program code means for receiving, that said requested file was created by an authorized author; and
- computer-readable program code means for publishing said requested file to said user only when said computer-readable program code means for authenticating has a successful result.

23. The computer program product for preventing information from being published after an unauthorized alteration of said information according to claim 22, further comprising:
- computer-readable program code means for notifying said user that said requested file was not found when said computer-readable program code means for authenticating has an unsuccessful result.

24. The computer program product for preventing information from being published after an unauthorized alteration of said information according to claim 23, further comprising computer-readable program code means for generating an additional notification when said computer-readable program code means for authenticating has said unsuccessful result, said additional notification comprising one or more of: an alert and a log record.

25. The computer program product for preventing information from being published after an unauthorized alteration of said information according to claim 22, wherein said computer-readable readable program code means for authenticating further comprises:
- computer-readable program code means for retrieving said requested file from said storage medium;
- program code means for computing a cryptographic digest of said retrieved file;
- computer-readable program code means for decrypting said stored digital signature for said retrieved file; and
- computer-readable program code means for comparing said computed digest to said decrypted signature, wherein said successful result occurs when said computer-readable program code means for comparing detects that said computed digest and said decrypted signature are identical.

26. The computer program product for preventing information from being published after an unauthorized alteration of said information according to claim 22, wherein said computer-readable program code means for authenticating further comprises:
- computer-readable program code means for retrieving said requested file from said storage medium;
- computer-readable program code means for computing a cryptographic digest of said retrieved file;
- first computer-readable program code means for determining whether an entry exists in a validation cache for said requested file said entry comprising a previously-validated digest for said requested file;
- first computer-readable program code means for comparing said computed digest to said previously-validated digest, wherein said successful result occurs when said first computer-readable program code means for comparing detects that said computed digest and said previously-validated digest are identical: and
- computer-readable program code means for validating said retrieved file when said entry does not exist or said first computer-readable program code means for comparing detects that said computed digest and said previously-validated digest are not identical, further comprising:
  - computer-readable program code means for decrypting said stored digital signature for said retrieved file; and
  - second computer-readable program code means for comparing said computed digest to said decrypted signature, wherein said successful result occurs when said second computer-readable program code means for comparing detects that said computed digest and said decrypted signature are identical; and further comprising:
- computer-readable program code means for storing said computed digest in said validation cache for a future invocation of said computer-readable program code means for authenticating when said computer-readable program code means for authenticating has said successful result.

27. The computer program product for preventing information from being published after an unauthorized alteration of said information according to claim 22, wherein said authorized author may be an automated file generation process.

28. A computer program product on a computer-readable medium for securing Web server content in a computing environment connected to a network, comprising:
- one or more files stored on a storage medium accessible to a Web server in said computing environment;
- a digital signature for each of said one or more files, each of said digital signatures being stored in a location accessible to said Web server;
- computer-readable program code means for authenticating that selected ones of said stored files were created by an authorized author; and
- for any ones of said selected files for which said computer-readable program code means for authenticating has an unsuccessful result, computer-readable program code means for making said ones unavailable for publishing over said network.

29. The computer program product for securing Web server content according to claim 28, wherein said computer-readable program code means for making said ones unavailable comprises computer-readable program code means for deleting said ones of said selected files from said storage medium.

30. The computer program product for securing Web server content according to claim 28, wherein said computer-readable program code means for authenticating further comprises:
  computer-readable program code means for retrieving each of said selected ones from said storage medium; and
  computer-readable program code means for validating each of said retrieved ones, further comprising:
    computer-readable program code means for computing a cryptographic digest of said retrieved file;
    computer-readable program code means for decrypting said stored digital signature for said retrieved file; and
    computer-readable program code means for comparing said computed digest to said decrypted signature, wherein said unsuccessful result occurs when said computer-readable program code means for comparing detects that said computed digest and said decrypted signature are not identical.

31. A computer program product on a computer-readable medium for securely serving an aggregated document from a first server connected to a computer network to a user connected to said network, wherein said aggregated document is comprised of one or more other documents obtained by said first server from one or more other servers in addition to zero or more documents locally accessible to said first server, said system comprising:
  computer-readable program code means for requesting said one or more other documents from selected ones of said other servers;
  computer-readable program code means for receiving said requested documents;
  computer-readable program code means for validating that each of said received documents was created by an authorized author, further comprising:
    computer-readable program code means for computing a cryptographic digest of said received document;
    computer-readable program code means for retrieving a digital signature for said received document, wherein said digital signature was previously created by an author of said received document;
    computer-readable program code means for decrypting said retrieved digital signature using a public key of said author; and
    computer-readable program code means for comparing said decrypted signature to said, computed digest, wherein said computer-readable program code means for comparing has a successful outcome only if said decrypted signature and said computed digest are identical; and
  computer-readable program code means for serving said aggregated document to said user only if each of said received files has said successful outcome in said means for comparing.

* * * * *